(12) United States Patent
van der Meulen

(10) Patent No.: US 7,823,504 B2
(45) Date of Patent: Nov. 2, 2010

(54) CUTTING FRAME FOR USE IN A CURD VAT

(75) Inventor: Wieger van der Meulen, Damwoude (NL)

(73) Assignee: Tetra Laval Holdings & Finance S.A. (CH)

( * ) Notice: Subject to any disclaimer, the term of this patent is extended or adjusted under 35 U.S.C. 154(b) by 653 days.

(21) Appl. No.: 11/756,943

(22) Filed: Jun. 1, 2007

(65) Prior Publication Data

US 2007/0277680 A1 Dec. 6, 2007

(30) Foreign Application Priority Data

Jun. 2, 2006 (NL) .................................... 1031949

(51) Int. Cl.
*A23L 1/00* (2006.01)
*A01J 25/00* (2006.01)

(52) U.S. Cl. .......................................... 99/466; 99/452

(58) Field of Classification Search .................. 99/458, 99/460, 461, 466, 462, 465; 366/144, 149, 366/325.1; *A01J 11/00*
See application file for complete search history.

(56) References Cited

U.S. PATENT DOCUMENTS

| 4,108,058 | A | * | 8/1978 | Sjoholm et al. ................ 99/466 |
| 4,989,504 | A |   | 2/1991 | Jay |
| 6,367,375 | B2 | * | 4/2002 | Sipma et al. .................. 99/466 |
| 6,418,836 | B2 | * | 7/2002 | Sipma et al. .................. 99/466 |

FOREIGN PATENT DOCUMENTS

| CH | 666384 A5 | 7/1988 |
| EP | 1084609 A1 | 3/2001 |

OTHER PUBLICATIONS

Patent Search Report.

* cited by examiner

*Primary Examiner*—Quang T Van
(74) *Attorney, Agent, or Firm*—Quarles & Brady LLP

(57) ABSTRACT

A cutting frame for use in a curd vat, which cutting frame comprises substantially parallel frame girders, between which is situated a lattice formed from longitudinal knives and transverse knives, of which the transverse knives are mounted on the frame girders by welding and have aligned openings, in which the longitudinal knives are received, wherein the longitudinal knives are strip-shaped knives having a length dimension and a width dimension and having at least one sharp cutting edge extending in the length dimension, which cutting edge is formed by at least one obliquely ground cutting face, wherein the width of the longitudinal knives is smaller than the corresponding dimension of the openings of the transverse knives, and wherein means are provided for substantially preventing displacement of the longitudinal knives in the length dimension, wherein at least a number of openings of at least a number of transverse knives is provided with supporting elements which substantially lock the longitudinal knives both in lateral direction and in the width dimension of the longitudinal knives, while the supporting elements leave the sharp cutting edge clear.

14 Claims, 8 Drawing Sheets

CUTTING FRAME FOR USE IN A CURD VAT

CROSS REFERENCES TO RELATED APPLICATIONS

This application claims the priority benefit of NL 1031949 filed on Jun. 2, 2006.

STATEMENT REGARDING FEDERALLY SPONSORED RESEARCH

Not Applicable.

BACKGROUND OF INVENTION

This invention relates to a cutting frame for use in a curd vat, which cutting frame comprises substantially parallel frame girders, between which is situated a lattice formed from longitudinal knives and transverse knives, of which the transverse knives have been mounted on the frame girders by welding and have aligned openings, in which the longitudinal knives are received and wherein means are provided for substantially preventing displacement of the longitudinal knives in the longitudinal direction.

The invention furthermore relates to a curd vat, also designated, for instance, as cheese vat, curd tank, curd container, cheese tank, etc., provided with one or more of such cutting frames. Such a curd vat may for instance be of a type as described in U.S. Pat. No. 4,108,058 or, for instance, of a type as marketed by Tetra Pak Tebel under the name of OST5. These known curd vats have a single rotatable shaft provided with a number of cutting frames mounted in staggered relation. The cutting frames according to the present invention, however, are also applicable in differently built-up curd vats, for instance curd vats with two shafts provided with cutting frames, as described, for instance, in U.S. Pat. No. 4,989,504. Further, the curd vats may be of the upright or lying type, whereby the shaft or shafts provided with cutting frames extends or extend substantially vertically and horizontally, respectively.

A cutting frame of the above-described kind and a curd vat provided with such cutting frames for cutting and stirring curd are known from European Patent 1084609.

All known apparatuses are arranged for stirring and cutting curd which has formed in the curd vat in that the vat has been filled with milk, to which starter and rennet have been added. To that end, depending on the type, one or more central shafts provided with cutting frames are driven for rotation, so that the cutting frames move through the curd formed. The cutting frames are usually so designed that the knives and the frame girders form a cutting edge along one edge and are blunt and rounded off along the other edge. Accordingly, rotation of the central shaft(s) in one direction yields substantially a cutting action, while rotation in the other direction yields substantially a stirring action.

A problem which occurs in older known apparatuses but which has been solved by the construction described in European Patent 1084609 is that the cutting frames in the older apparatuses comprise many welds, which must all be polished very well to prevent accumulation of contaminants and bacterial growth. The longitudinal knives can be arranged, for instance, with interspaces of the order of 4 to 5 cm and the transverse knives with interspaces of, for instance, 14.5 to 17.5 cm. A cutting frame can, for instance, have a total width of the order of 50 cm and a length of, for instance, 150 cm. This means that a single cutting frame can comprise, for instance, about 100 rectangular lattice openings, each having four corners, where a longitudinal knife or a frame girder is welded to a transverse knife. Each of those welds not only needs to be provided, but also needs to be accurately polished to satisfy the requirements set by government regulations regarding cleanability. For the welding operation, however, little space is available within the lattice openings formed by the longitudinal and transverse elements of a cutting frame. As a consequence, the welding work and the polishing work are very time consuming and costly.

According to the solution to the outlined problem described in European Patent 1084609, the longitudinal knives are situated in the openings of the transverse knives with ample play, while displacement of the longitudinal knives in the longitudinal direction is prevented by special means. These special means can for instance comprise a locking pin arranged through openings in the transverse knives and the frame girders, or, for instance, a small number of welds, preferably a single weld, for securing a longitudinal knife to a small number of transverse knives, preferably one transverse knife. In this way, the necessary welding and polishing work is considerably reduced and simplified, while yet an effective cutting and stirring action and a good cleanability remain guaranteed.

In practice, it has been found that in the course of time the cutting edge of the longitudinal knives can exhibit wear adjacent the openings of the transverse knives, as well as in a small area before and behind the transverse knives. This is due to the fact that during a stirring movement of the cutting frame, the cutting edge of the longitudinal knives, since the latter are situated in the openings in the transverse knives with ample play, is pushed against the edge of the openings, whereby moreover some torsion may occur in the longitudinal knives, which presumably worsens the wear referred to.

SUMMARY OF THE INVENTION

The object of the invention is to obviate the problem outlined. To this end, according to the invention, in a cutting frame of the type described in the preamble, at least a number of openings of at least a number of transverse knives is provided with supporting elements which substantially lock the longitudinal knives both in the lateral direction and in the width dimension, while the supporting elements leave the sharp cutting edge clear.

BRIEF DESCRIPTION OF THE DRAWINGS

In the following, the invention will be further described with reference to the accompanying drawing.

DETAILED DESCRIPTION OF PREFERRED EMBODIMENTS

Figure 1:
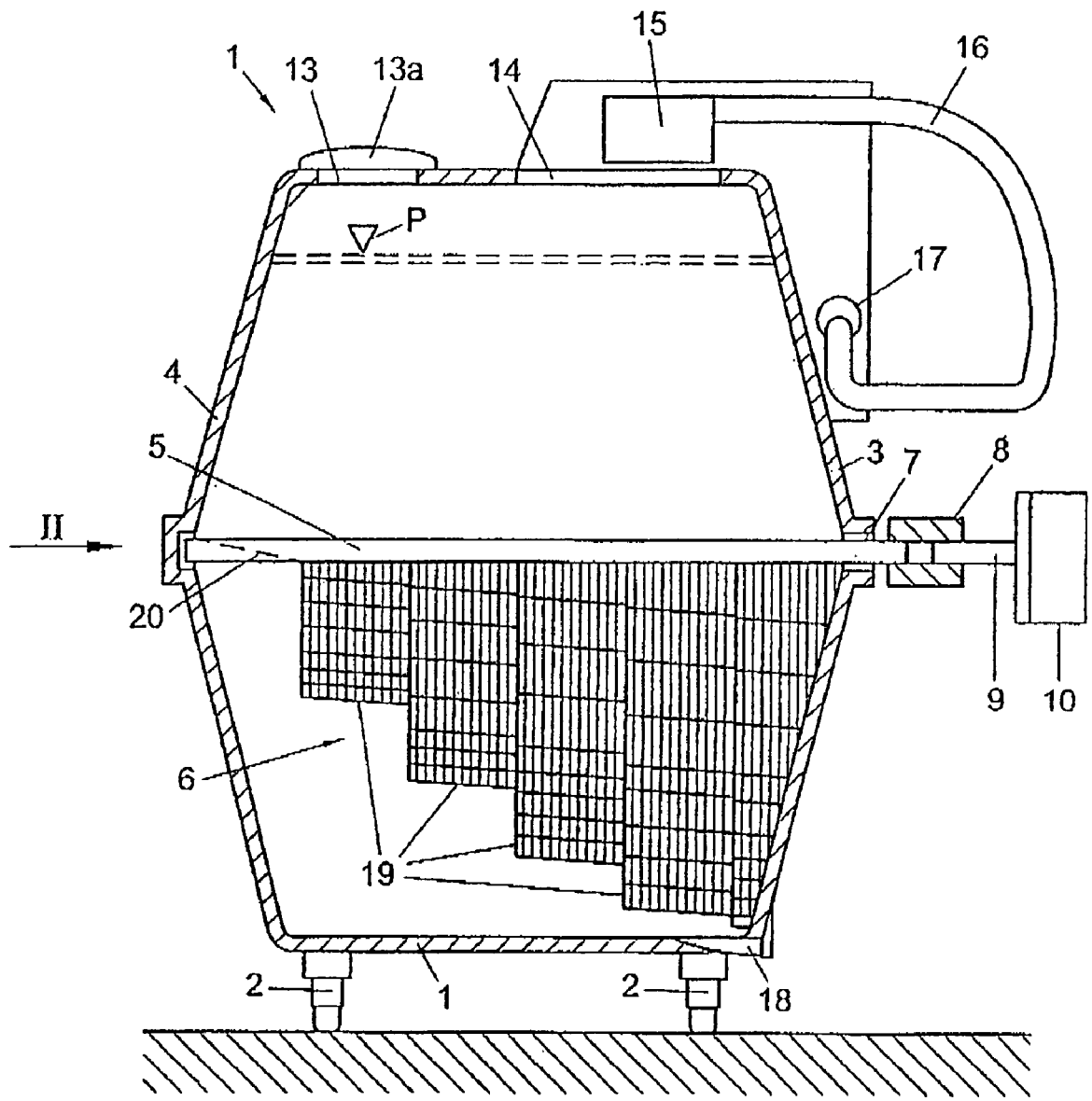
FIG. 1 schematically shows in longitudinal cross section an example of a known curd vat in which curd can be stirred and cut.
Figure 2:
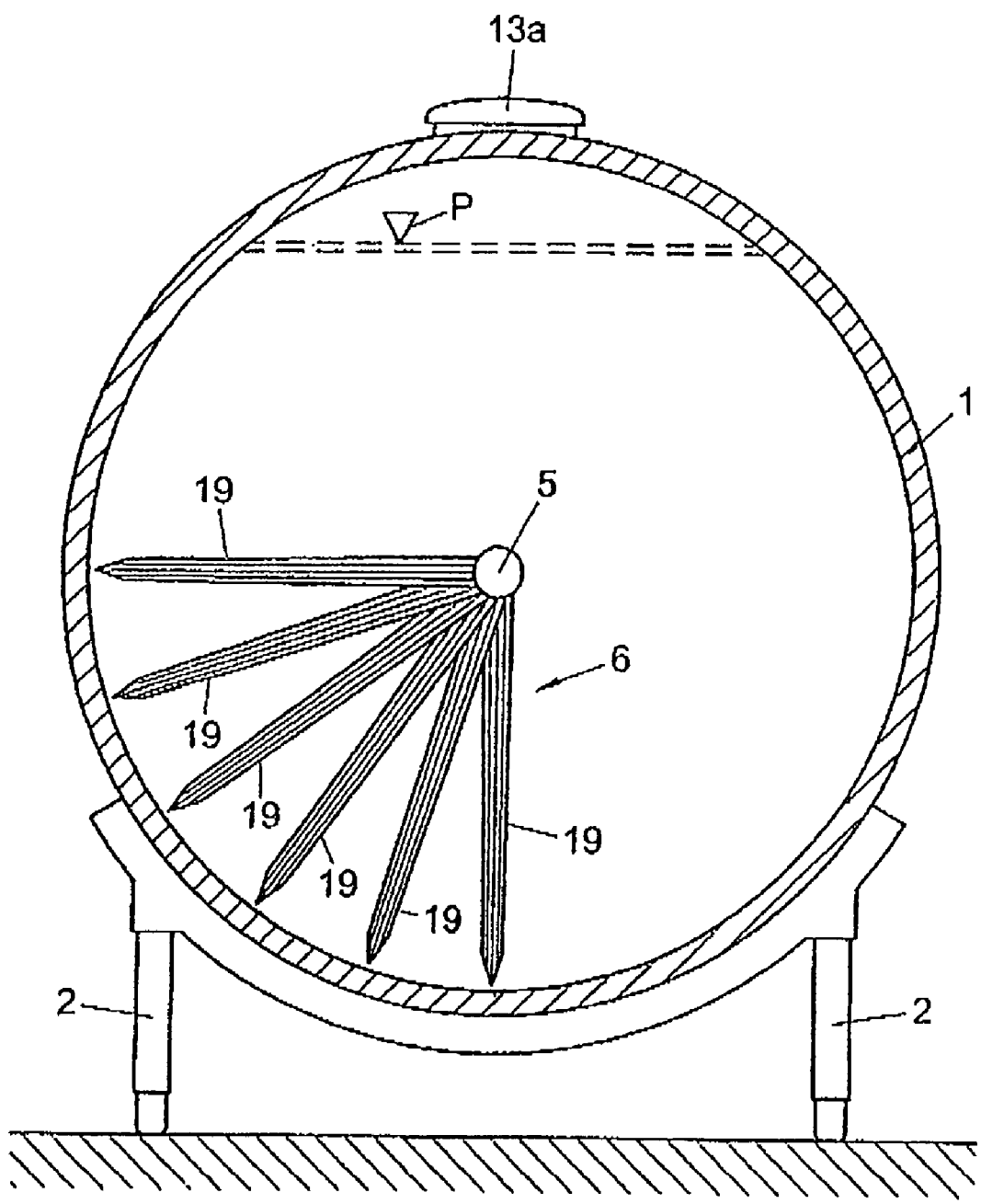
FIG. 2 schematically shows the apparatus of FIG. 1 in a cutaway view in the direction of the arrow II in FIG. 1.

In FIGS. 1 and 2 a known cylindrical horizontally-disposed curd vat 1 is shown, which is supported by a number of legs 2. The end walls 3, 4 of the curd vat 1 are of conical design in this example and through one of these end walls a shaft 5 extends centrally into the curd vat. In this example, a single central shaft is used. This shaft, which in this example is journaled in the opposite end wall, carries a set of cutting frames 19, generally indicated by 6, for cutting and stirring curd in the curd vat. Reference numeral 7 designates a sealing element between the shaft 5 and the wall 3 through which the shaft 5 extends into the curd vat.

Outside the curd vat, the shaft 5 in this example is connected by means of a coupling 8 to a second shaft 9 of a drive motor 10. The motor 10 is arranged for rotating the cutting frames around the centerline of the curd vat 1 alternately in one direction and the other.

In this example, the curd vat 1 in its upper part has a manhole 13 which is covered by a manhole cover 13a. In this example, further, another opening is provided in the upper part of the curd vat 1, which opening is designated by 14 and is intended for the immersion of a whey sieve 15 in the curd vat 1. The whey sieve 15 in this example is supported by a bent pipe 16 which is rotatably connected with the curd vat 1 at 17. The curd vat 1 has an inlet, not shown, and an outlet 18 at its lowest part. A triangle P indicates a customary level of the curd in the curd vat. It is noted that the invention is also applicable to differently designed curd vats, such as for instance curd vats having more than one inlet and/or outlet or curd vats having more than one shaft provided with cutting frames, or curd vats having one or more vertical shafts, etc. The shaft 5 carries a number of cutting frames 19 which are situated side by side along the shaft 5, as appears from FIG. 1. In the embodiment shown, six cutting frames are used. The number of sections depends on the size of the vat. The cutting frames in this example are connected to the shaft so as to form angles with each other, as can be seen in FIG. 2. In the embodiment shown, the cutting frames are placed along the shaft 5 so as to extend outwardly from the shaft in a helical configuration.

Each of the cutting frames may further be fitted on the shaft 5 at an angle, as illustrated in FIG. 1 by a broken line 20 indicating the cutting frame which is located farthest to the left and is hidden by the shaft 5.

Figure 3:
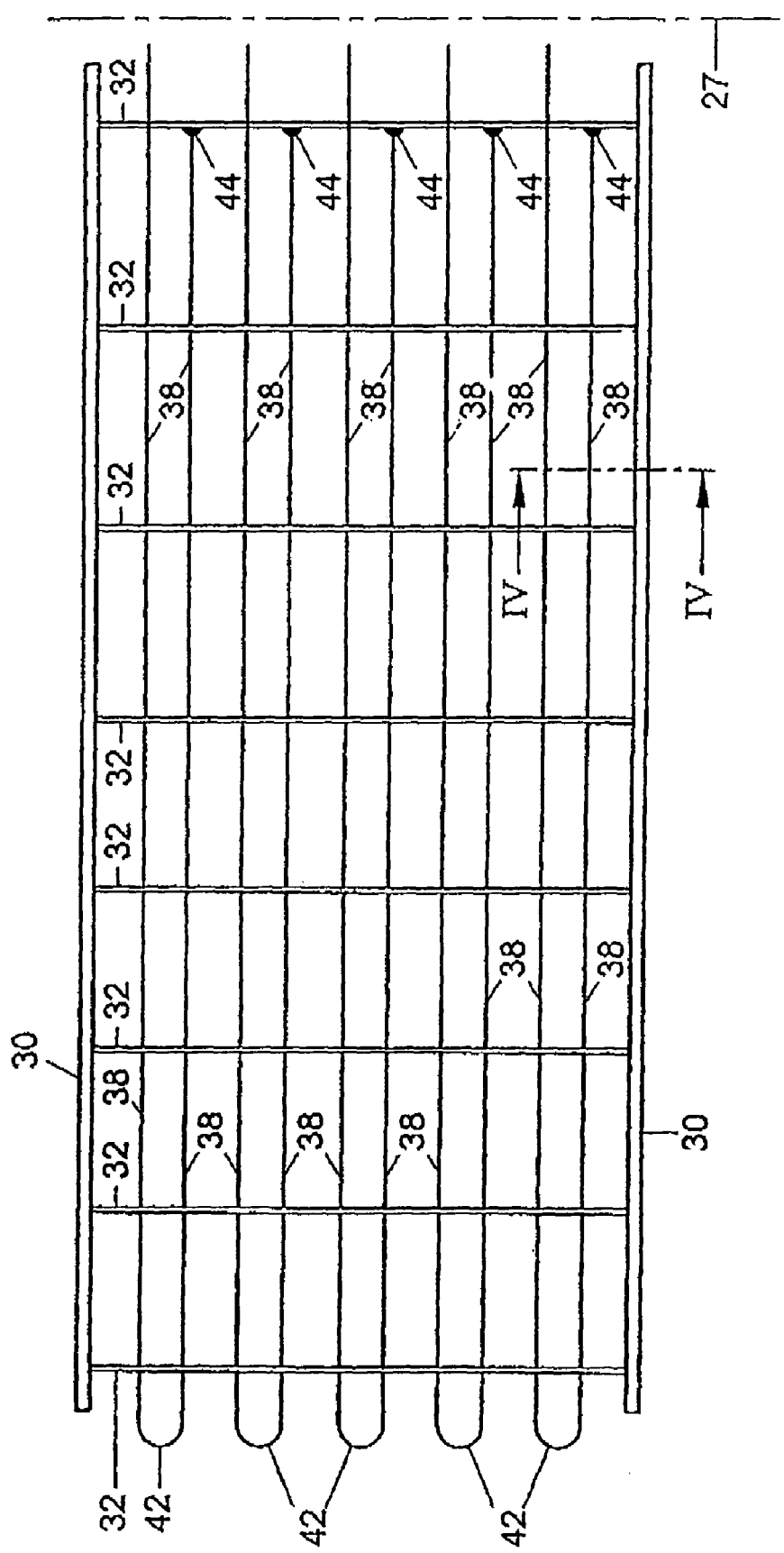
FIG. 3 schematically shows in top plan view an example of a cutting frame according to European Patent 1084609.
Figure 4:
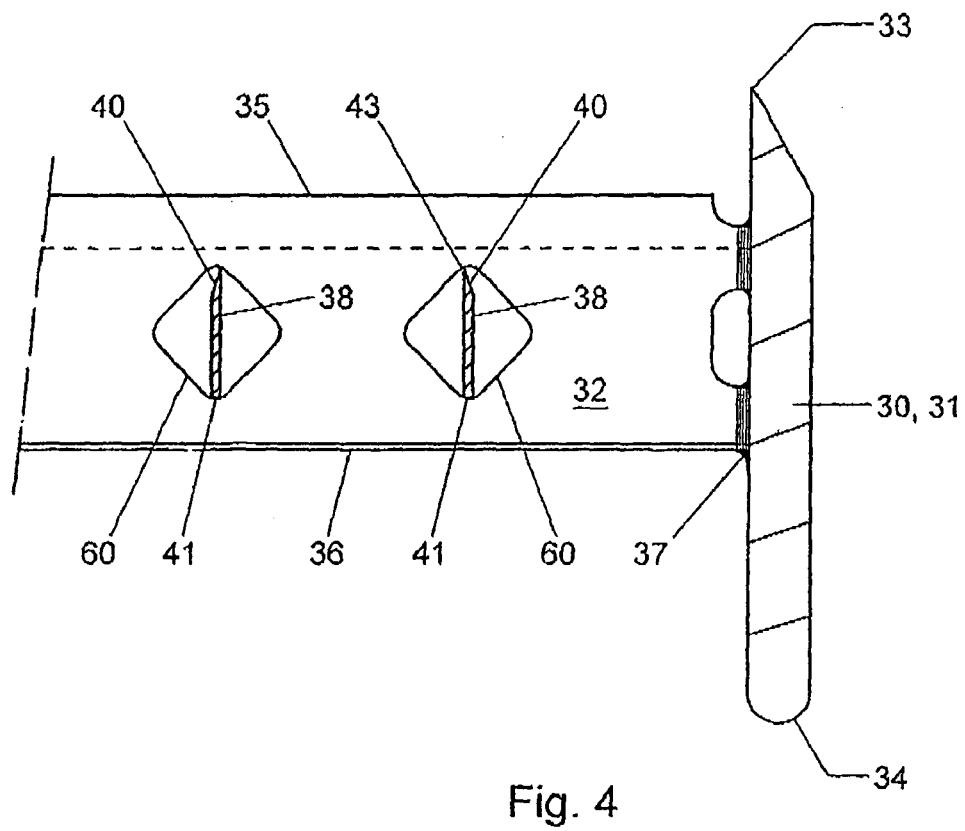
FIGS. 4 and 5 schematically show, in cross section along the line IV-IV in FIG. 3, examples of receiving openings provided in a transverse knife, in a cutting frame according to European Patent 1084609.
Figure 5:
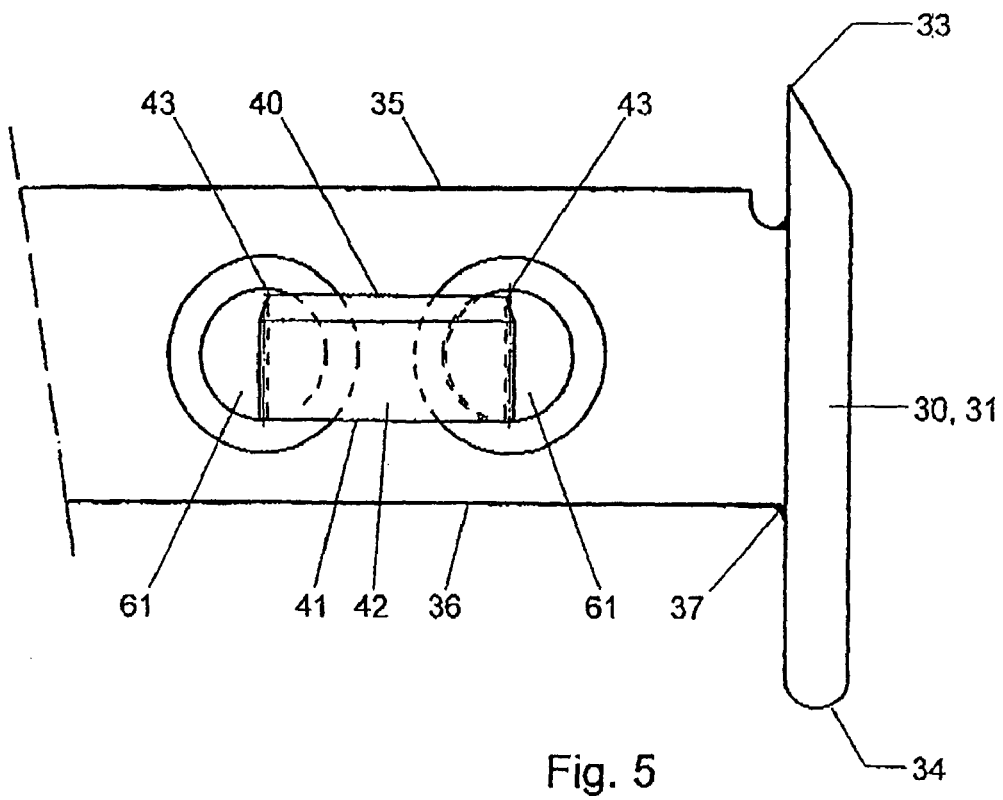

FIG. 3 schematically shows in top plan view an example of a cutting frame as known from European Patent 1084609, which is understood to be incorporated herein by reference, and FIG. 4 schematically shows a partial cross section along the line IV-IV of the cutting frame of FIG. 3. The cutting frame shown can be mounted in a conventional manner on a central rotatable shaft 5, whose centerline 27 is indicated schematically in FIG. 3. The cutting frame shown comprises two substantially parallel frame girders 30, 31, between which transverse knives 32 extend in transverse direction. The frame girders have a sharp cutting edge 33, which is situated at the top in FIG. 4, and a blunt, in this example rounded, lower edge 34. Also, the transverse knives 32 have corresponding cutting edges 35 and blunt edges 36. Similarly, the longitudinal knives have a sharp cutting edge 40 and a blunt edge 41, see FIG. 4 and FIG. 5. The longitudinal knives further have a length dimension, in which the cutting edge lies, a width dimension and a thickness. If desired, the transverse knives 32 and/or the longitudinal knives 38 can also have a cutting edge on both sides. The transverse knives are connected at the ends with the frame girders in a conventional manner by welds 37 (FIG. 4 and FIG. 5). The transverse knives are furthermore each provided with a series of openings, uniformly distributed along the length of the transverse knives. Each opening of a transverse knife is in line with corresponding openings of the other transverse knives and the openings are so designed that a longitudinal knife 38 can be slid into them. The longitudinal knives 38 are arranged loosely in the openings with a relatively large play. In this way, accumulation of curd material at the intersections of transverse and longitudinal knives is prevented and a good cleanability is obtained. The longitudinal knives can be assembled in a simple manner by sliding them into the openings of the transverse knives. The longitudinal knives can thereupon be jointly fixated, for instance in the manner known from European Patent 1084609, with one or more transverse pins, or individually with a small number of welds, preferably one weld, as also described in European Patent 1084609. In the example shown, U-shaped longitudinal knives are used, each consisting of two straight longitudinal knives 38, which are connected with each other by a bent part 42. In the embodiment of FIG. 3, one of the legs of such a U-shaped knife is welded to the transverse knife that is closest to the centerline 27 of the central shaft. The welds are indicated at 44 in FIG. 3.

The openings in the transverse knives, according to European Patent 1084609, have various shapes, for instance a circular, oval, rectangular or diamond shape. In general, the shape of the openings is such that the freedom of lateral movement of the longitudinal knives is limited adjacent the cutting edge and the blunt edge. The edges of an opening or at least the lower portion thereof may be provided with cut edges. If desired, also the upper edges, or all edges of the openings may be of sharp design so as to obtain a smallest possible contact surface with the longitudinal knives and a least possible chance of caking of dirt.

Examples of receiving openings for a longitudinal knife provided in a transverse knife are schematically shown in FIGS. 4 and 5, each showing two adjacent openings 60 and 61, respectively, in which a U-shaped bent longitudinal knife 38 is received.

As already noted, it has been found in practice that in the course of time the cutting edge 40 of the longitudinal knives of a cutting frame as described in European Patent 1084609 exhibits wear in the area 43 at and near the openings in the transverse knives, as indicated in FIG. 4 and FIG. 5.

This problem can be solved according to the invention without adversely affecting the construction of the cutting frame on points such as cleanability, flushability, simplicity, rapid assembly and finish.

Figure 6:
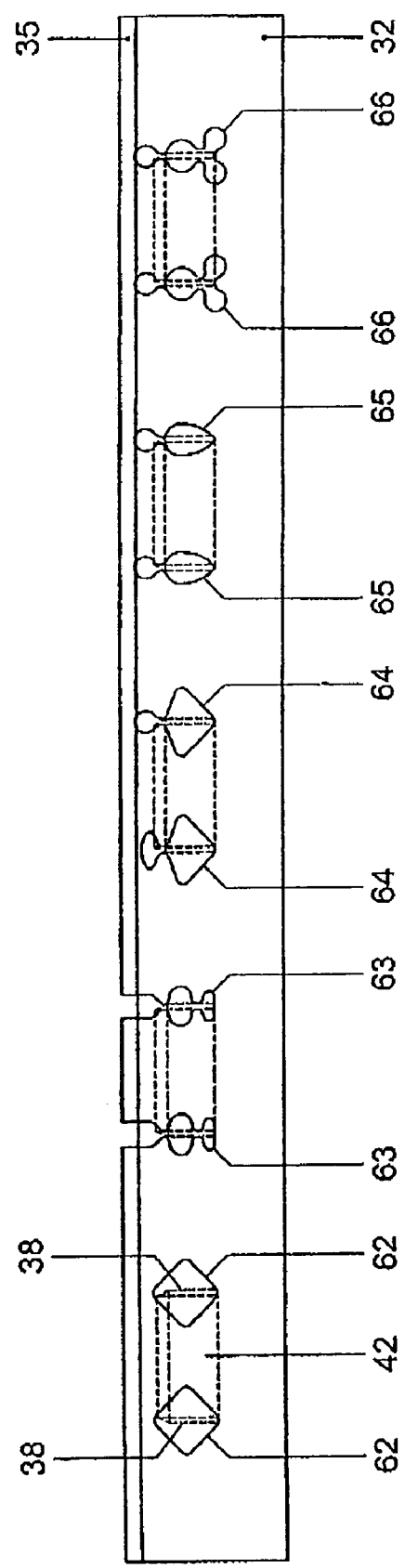
FIG. 6 schematically shows in illustration a transverse knife with a pair of openings for a longitudinal knife according to European Patent 1084609 and a number of examples of pairs of openings according to the invention.

FIG. 6 schematically shows a transverse knife 32 for a cutting frame, in which are drawn, by way of example, a number of pairs of variants of passage openings according to the invention as well as one pair of known passage openings for U-shaped longitudinal knives 38. In FIG. 6, the respective longitudinal knives are represented in broken lines. The pairs of passage openings are indicated from left to right by 62, 63, 64, 65, and 66. The openings 62 correspond to the diamond-shaped openings 60 of the known transverse knife shown in FIG. 4 and are shown solely for the purpose of comparison.

The other openings 63 to 66 deviate from these known openings in that they form supporting elements, which support a longitudinal knife extending through an opening at the wedge-shaped portion which forms the sharp cutting edge 40. The cutting edge proper, however, is left clear by the supporting elements, as can be seen in FIG. 6 and also in FIGS. 7 to 11.

The supporting elements generally have the shape of, preferably rounded, projections in the form of, for instance, fingers, ears or the like, which form part of the edges of the openings in the transverse knives. Owing to the rounded shape, a small contact surface with the longitudinal knives is obtained. The openings 64 and 65 could be described as vase-shaped openings, the vase shape having a narrow neck zone that forms two rounded projections 70, 71.

The sharp cutting edge of the knives has been formed by grinding the knives obliquely on one side, so that an oblique cutting face 50 is formed, which ends in the actual cutting edge 40.

Figure 7:
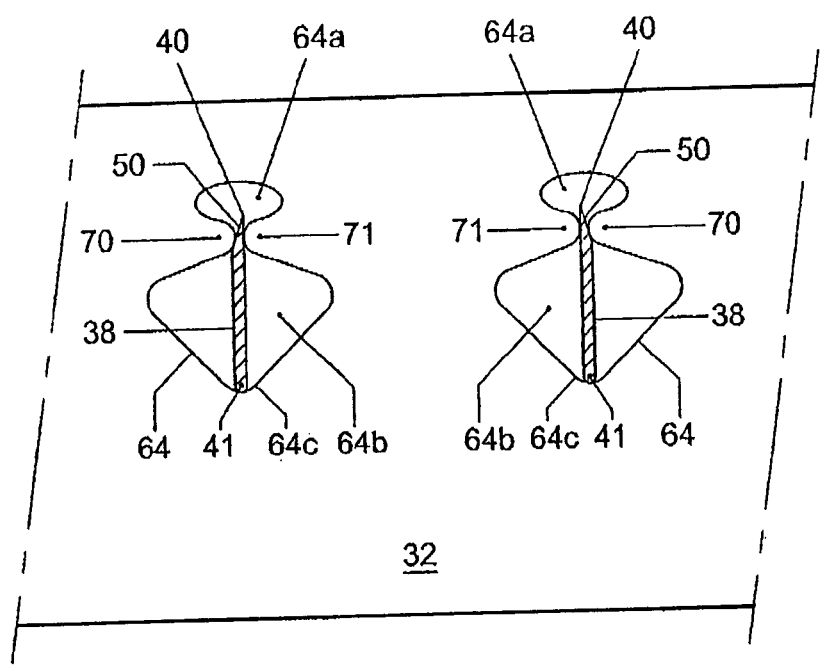
FIGS. 7 to 11 show on a slightly larger scale examples of receiving openings for longitudinal knives according to the invention.
Figure 8:
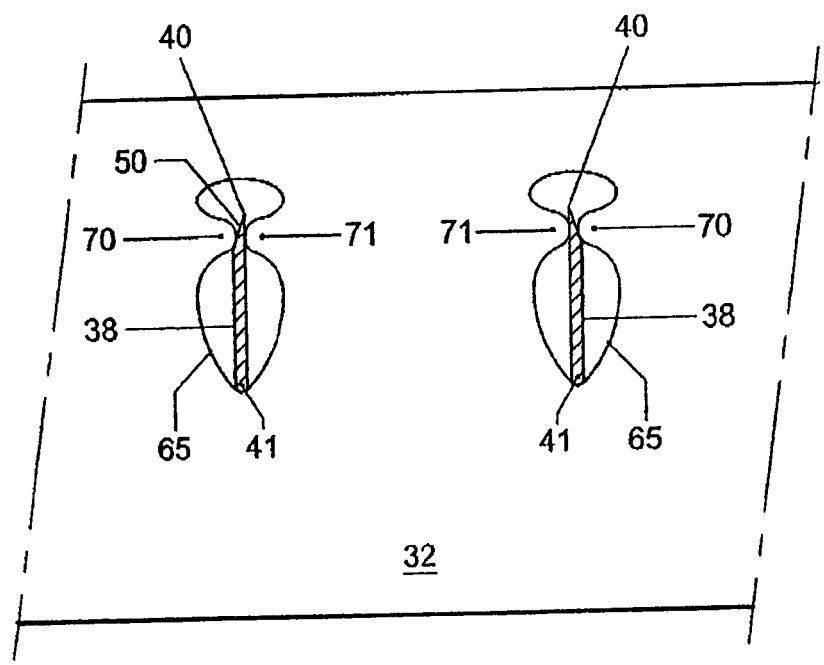
Figure 9:
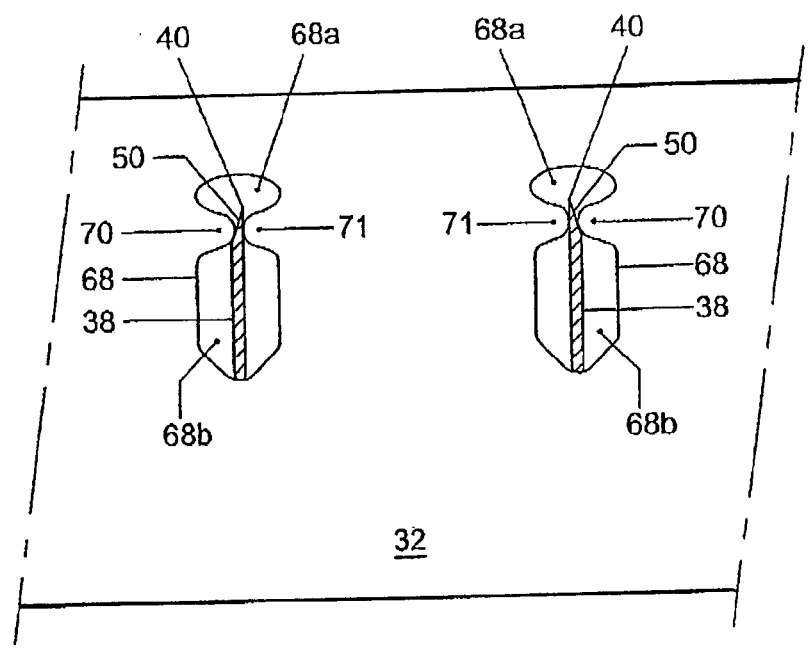

The projections 70, 71 abut against the longitudinal knives at the wedge-shaped edge 50 of the longitudinal knives, as drawn to a slightly larger scale in FIGS. 7 and 8. The sharp cutting edge 40 proper, however, extends just beyond the projections and lies clear. The longitudinal knives 38 are therefore fixated by the projections 70, 71 both in the horizontal and in the vertical direction ('horizontal' and 'vertical' are here related to the situation in FIGS. 6, 7, and 8; in practice, a cutting frame can take up many positions with an associated orientation of the knives).

The openings 64 in the orientation shown have an upper portion 64a, which is situated above the pair of projections 70, 71, and a lower portion 64b, which is below the projections. The sharp cutting edge 40 of a longitudinal knife 38 extends just beyond the projections into the upper portion 64a of the opening 64. The rest of the longitudinal knife, viewed in cross section, is situated in the lower portion 64b of the opening 64. The blunt lower edge 41 of a longitudinal knife 38 rests on the lower edge portion of the lower part 64b of the opening. In the case of the openings 64, the lower edge portion is shaped such that, in the plane of the paper, i.e., in a plane extending transversely to the longitudinal direction of the longitudinal knives, it forms an approximately cup-shaped or V-shaped portion 64c, in which the blunt lower edge 41 of the longitudinal knife is received. As a result, the blunt lower edge cannot, or hardly so, move laterally. The projections engaging the oblique cutting face 50 of the longitudinal knife limit both the possibility of lateral movement of the upper edge of the longitudinal knife and the possibility of vertical movement of the longitudinal knife. Accordingly, the cup-shaped or V-shaped portion 64c of the lower edge of the opening 64, together with the projections, substantially prevents torsion of a longitudinal knife.

The openings 65 shown in FIG. 8 are slightly narrower and more pointed at the lower end than the openings 64 but for the rest have similar projections 70, 71 and have a similar fixation effect to the openings 64.

Figure 10:
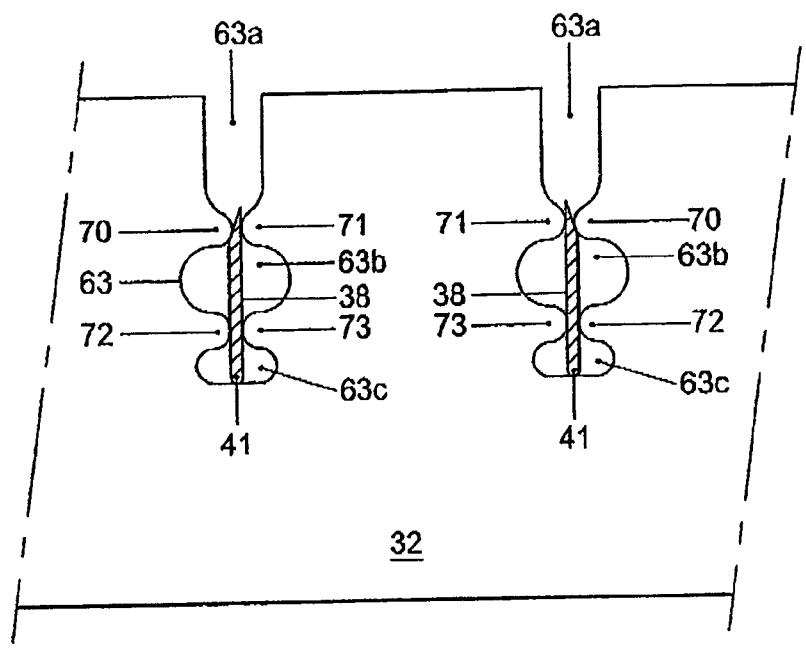
Figure 11:
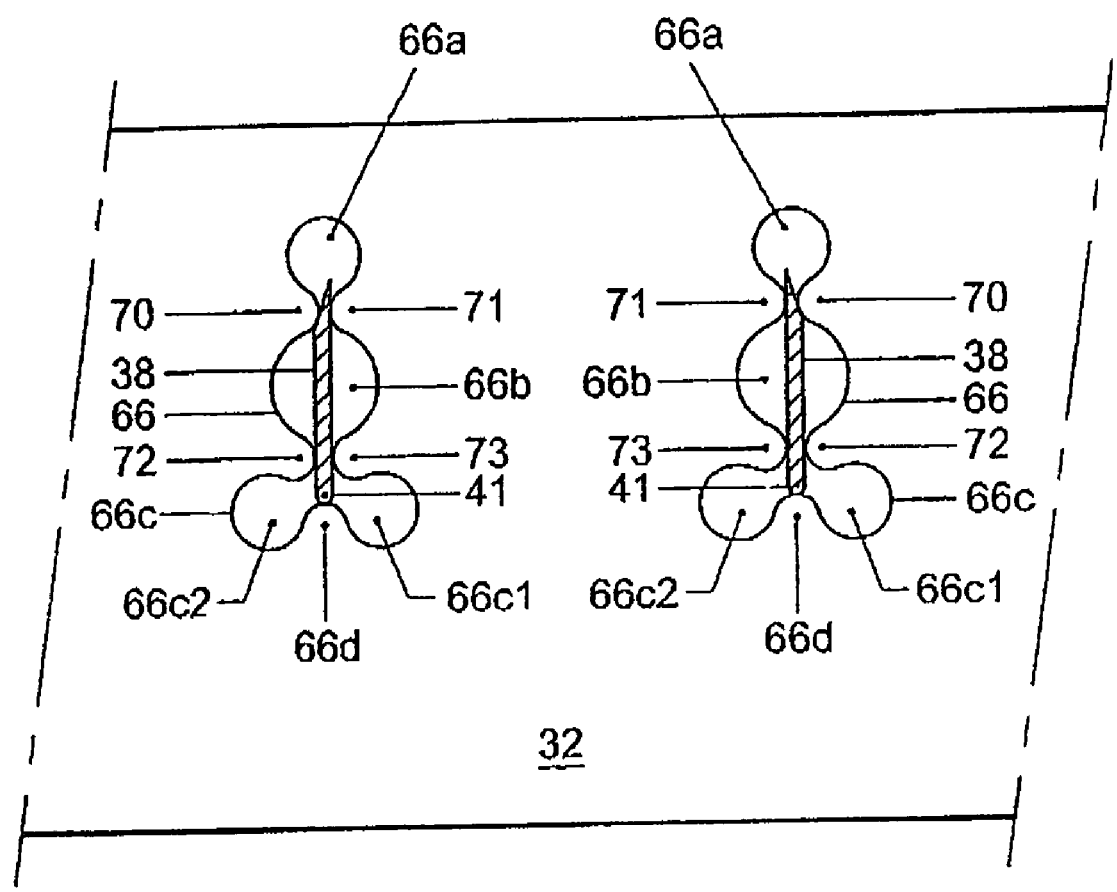

The openings 63 and 66 shown in FIGS. 10 and 11 differ from the openings 64 and 65 in that the openings 63 and 66, besides having the projections 70, 71 near the sharp edge 40 of a longitudinal knife 38, additionally have projections 72, 73 near the blunt lower edge 41 of a longitudinal knife situated in an opening, which projections 72, 73 support the lower part of the longitudinal knife laterally. In this way, while maintaining the good flushability, the possibility of lateral movement can be limited to a still larger extent.

The openings 63 and 66 accordingly have an upper portion 63a and 66a, respectively, which is situated above the projections 70, 71, a middle portion 63b and 66b, respectively, in which the body of a longitudinal knife is located, and a lower portion 63c and 66c, respectively, situated below projections 72, 73, in which the lower edge 36 of a longitudinal knife is disposed, in the example of the openings 63 on a substantially straight lower edge of the lower portion 63c.

In the example of the openings 66 of FIG. 11, the blunt lower edge 41 of a longitudinal knife rests on a locally upwardly extending section 66d of the lower edge of the lower portion 66c, so that a still more open construction with a very good flushability is formed. The lower portion 66c of the opening 66 in this example consists of two lobes 66c1 and 66c2, situated on opposite sides of the locally upwardly extending section 66d.

Another variant is shown at the openings 63 of FIG. 10, of which the upper portion 63a has been continued as far as the edge 35 of the transverse knife 32. This also promotes the openness of the construction. An upper portion of the passage opening for a longitudinal knife that is open towards the upper edge 35 of the transverse knife can, if desired, also be used in other variants of the passage openings. Likewise, an upwardly extending section between two lobes, as shown in FIG. 11, can also be used in other exemplary embodiments with projections 72, 73 which support the lower part of a longitudinal knife.

It is noted that many variants of the receiving openings for the longitudinal knives in the transverse knives are possible. For the sake of completeness, in FIG. 9 a variant of the example of FIG. 8 is shown, where a vase-shaped opening 68 with an upper part 68a and a lower part 68b and locking projections 70, 71 are used, and where the lower part 68b is made of slightly more angular design than in FIG. 8.

Furthermore, it is noted that the cutting edge of the longitudinal knives in the examples shown has been formed by grinding the knives obliquely from one side. Accordingly, one projection 70 abuts against an oblique cutting face, while the other projection 71 abuts against a flat portion of the longitudinal knife. The projections should therefore be asymmetrical. If desired, however, it is also possible the grind the knives obliquely on both sides, so that a symmetrical cutting edge is formed, whereby both projections abut against an oblique edge and can be symmetrical. However, this requires an additional grinding operation.

If a longitudinal knife is used of which both longitudinal edges have been sharpened, the passage openings in the transverse knives may be provided with corresponding pairs of locking projections for cooperation with the two wedge-shaped portions of such a longitudinal knife.

The openings in the transverse knives can be cut out accurately, for instance using a laser. If desired, the rounded supporting elements may be sharpened at the contact surface with the longitudinal knives to further reduce the contact surface. The same may also be done at the location where a longitudinal knife rests on an opening edge.

Further, it is noted that the invention is applicable in all variants of the cutting frames, transverse knives, and longitudinal knives, as well as fastening methods therefor as described in European Patent 1084609, which is understood to be incorporated herein by reference. For instance, besides the U-shaped longitudinal knives already described, also simple straight knives may be used, or U-shaped knives which are slid into the openings in the transverse knives from different ends of a cutting frame. Also, transverse knives may be used that consist of two knives situated above each other with an interspace, the upper knife including an upper part of a receiving opening for a longitudinal knife and the lower knife including a lower part of the receiving opening. Such divided transverse knives are also understood to fall within the term transverse knives as used in this description and the claims.

Furthermore, it is possible that not all transverse knives have receiving openings with supporting elements. For instance, a transverse knife may have an opening with supporting elements for one longitudinal knife and an opening without supporting elements for an adjacent longitudinal knife.

It is also possible to use supporting elements in other configurations, where some projections are not situated straight opposite each other.

All of these and similar variants and modifications will be readily apparent to those skilled in the art and are understood to fall within the framework of the invention.

I claim:

1. A cutting frame for use in a curd vat, said cutting frame having substantially parallel frame girders, between which is situated a lattice formed from longitudinal knives and transverse knives, of which the transverse knives are mounted on the frame girders by welding and have aligned openings, in which the longitudinal knives are received, wherein the longitudinal knives are strip-shaped knives having a length dimension and a width dimension and having at least one sharp cutting edge extending in the length dimension, which cutting edge is formed by at least one oblique cutting face, wherein the width of the longitudinal knives is smaller than a corresponding dimension of the openings of the transverse knives, and wherein the longitudinal knives are prevented from being substantially displaced in the length dimension, said cutting frame comprising:

projections formed in at least a number of openings of at least a number of transverse knives, the projections contacting opposing faces of a longitudinal knife including the at least one oblique cutting face such that the cutting edge remains clear and to substantially lock the longitudinal knife in the lateral direction and the width dimension.

2. A cutting frame according to claim 1, wherein the projections extend from edges of said number of openings of said number of transverse knives and lie in a plane of the transverse knives.

3. A cutting frame according to claim 2, wherein the projections are rounded off at least at a location of contact with the longitudinal knives.

4. A cutting frame according to claim 2, wherein the projections have been sharpened at least at a location of contact with the longitudinal knives.

5. A cutting frame according to claim 1, wherein the projections include at least one pair of projections abutting on opposite sides against a longitudinal knife.

6. A cutting frame according to claim 5, wherein the projections of at least one pair are situated substantially straight opposite each other.

7. A cutting frame according to claim 1, wherein the projections include at least two projections which contact the longitudinal knife on opposite sides of the knife at locations closer to an other edge of the longitudinal knife than the cutting edge, the other edge being located opposite the cutting edge.

8. A cutting frame according to claim 7, wherein the at least two projections which contact the longitudinal knife closer to the other edge comprise at least one projection supporting the longitudinal knife at the other edge.

9. A cutting frame according to claim 7, wherein the longitudinal knife is supported by way of the other edge situated opposite the cutting edge on a section of the opening in the transverse knife that extends upwards between two lobes of the opening.

10. A cutting frame according to claim 1, wherein said number of openings comprises at least a number of openings with an upper portion that extends from the projections situated near the cutting edge of the longitudinal knives as far as a nearby cutting edge of the transverse knife.

11. A cutting frame according to claim 8, wherein a longitudinal knife is supported at the other edge by a section of the edge of the opening in the transverse knife that extends substantially transversely to the other edge.

12. A cutting frame according to claim 1, wherein the projections form an integral part of the transverse knives in that the projections form part of the openings.

13. A transverse knife for a cutting frame according to claim 1, provided with at least one opening designed with projections for a longitudinal knife.

14. A curd vat provided with at least one cutting frame according to claim 1.

* * * * *